United States Patent [19]

Blaskovic et al.

[11] 4,226,353
[45] Oct. 7, 1980

[54] FORMS FEED TRACTOR

[75] Inventors: Silvio U. Blaskovic, Highland Beach; Robert W. Cornell, Boca Raton, both of Fla.

[73] Assignee: International Business Machines Corporation, Armonk, N.Y.

[21] Appl. No.: 60,550

[22] Filed: Jul. 25, 1979

[51] Int. Cl.³ .......................... G03B 1/30; B65H 17/38
[52] U.S. Cl. ..................................................... 226/74
[58] Field of Search ................... 226/74, 75, 6, 52, 59, 226/170, 171

[56] References Cited

U.S. PATENT DOCUMENTS

| | | | |
|---|---|---|---|
| 2,179,156 | 11/1939 | Mabon | 226/75 |
| 2,286,084 | 6/1942 | Hageman | 226/75 |
| 3,317,102 | 5/1967 | Lizotte | 226/75 |
| 3,688,959 | 9/1972 | Staneck et al. | 226/75 |
| 3,825,162 | 7/1974 | Hubbard | 226/74 |
| 3,930,601 | 1/1976 | Masuda | 226/74 |
| 3,938,721 | 2/1976 | Staneck et al. | 226/75 |
| 3,941,288 | 3/1976 | Wanat | 226/74 |

Primary Examiner—Stanley N. Gilreath

[57] ABSTRACT

There is disclosed herein a forms feed tractor mechanism having a belt with pins and driving elements extending therethrough. The pins are adapted to engage perforated holes along the edge of a recorded medium. Driver means are provided for rotating the belt and pins and thereby rotate the engaged record medium. Also, there is provided a spring tensioner for maintaining tension on the belt. The tractor includes a door which is rotatably snapped fitted into the housing of the tractor and maintained above the plane of the record medium by an extension on the lower surface thereof.

6 Claims, 5 Drawing Figures

FORMS FEED TRACTOR

This invention relates to a forms feed tractor and, more particularly, to a forms feed tractor for moving a record medium, such as paper having edge perforations, through a printer or other similar apparatus for operating upon the record medium.

Forms feed mechanisms have been used for many years for moving paper through printers and the like. The paper utilized is conventional computer paper having pre-punched holes along both sides. A pair of tractor mechanisms are mounted at an appropriate place on the forms handling portion of the printer and pins within the tractor mechanism are inserted into the pre-punched holes on the paper. As the pins are moved, they carry the paper forward through the printer. Generally the tractor pins are arranged in an endless loop manner and means are provided within the tractor for rotating the endless loop, thereby causing the pins to move. Typically the pins may be mounted as portions of links adapted to be connected into a chain configuration or may be positioned in holes of a thin plastic or metal belt.

Prior art tractor mechanisms have a door member which is pivotally mounted on the frame of the tractor so that after the paper is inserted, the door is rotated to a position, generally parallel, but above the paper. The door, thus, functions to prevent the paper from becoming disengaged from the pins of the tractor when in the closed position. The door also must be able to be rotated to an open position to allow the paper to be initially affixed to the pins.

One of the major problems in the prior art forms feed tractor mechanisms has been the means to maintain the tractor door at an acceptable distance above the plane of the paper. In the past, this has been accomplished by providing a pin mounting to allow the rotational movement of the door and as a part of or adjacent to the pin mounting, providing tab or stop means against which the door rests when in a closed position. Because the stop means is close to the rotational mounting pin means, considerable stresses are provided on the pins or, in the alternative, on the stop means when configured as a tab. In the other case, the pins are likely to be broken after continual usage, and in the latter case, the tabs are likely to be bent and thereby prevent the proper distance from being maintained above the plane of the paper when the door is in the closed position.

Another problem with the prior art mounting of the doors is that by pinning the door to the main tractor housing, separate designs must be fabricated for the right hand and left hand tractors or, in the alternative, a door must be provided on both sides to allow the same tractor to be utilized for right hand and left hand mountings. Also, substantial manufacturing costs are expended in affixing the door to the tractor housing. It would be preferable to have a single tractor door which could be easily connected to both sides of the housing, or if necessary, easily removed from one side and connected to the other side to render the basic housing usable for a right hand tractor mechanism or a left hand tractor mechanism.

In accordance with one aspect of this invention, there is provided a forms feed tractor mechanism for moving a record medium having perforations therein comprising a plurality of feed pins for engaging the perforations, the feed pins being arranged in an endless loop means and means for moving the endless loop means. In addition, there is provided housing means for housing the endless loop means and door means pivotally affixed to the housing means and including means extending therefrom for engaging the housing means at a point remote from that portion of the housing means over which the record medium moves to maintain the bottom of the door means a desired distance above that portion of the housing over which the record medium moves.

A detailed description of one preferred embodiment of the present invention will hereafter be given with specific reference being made to the following figures in which.

Figure 1:
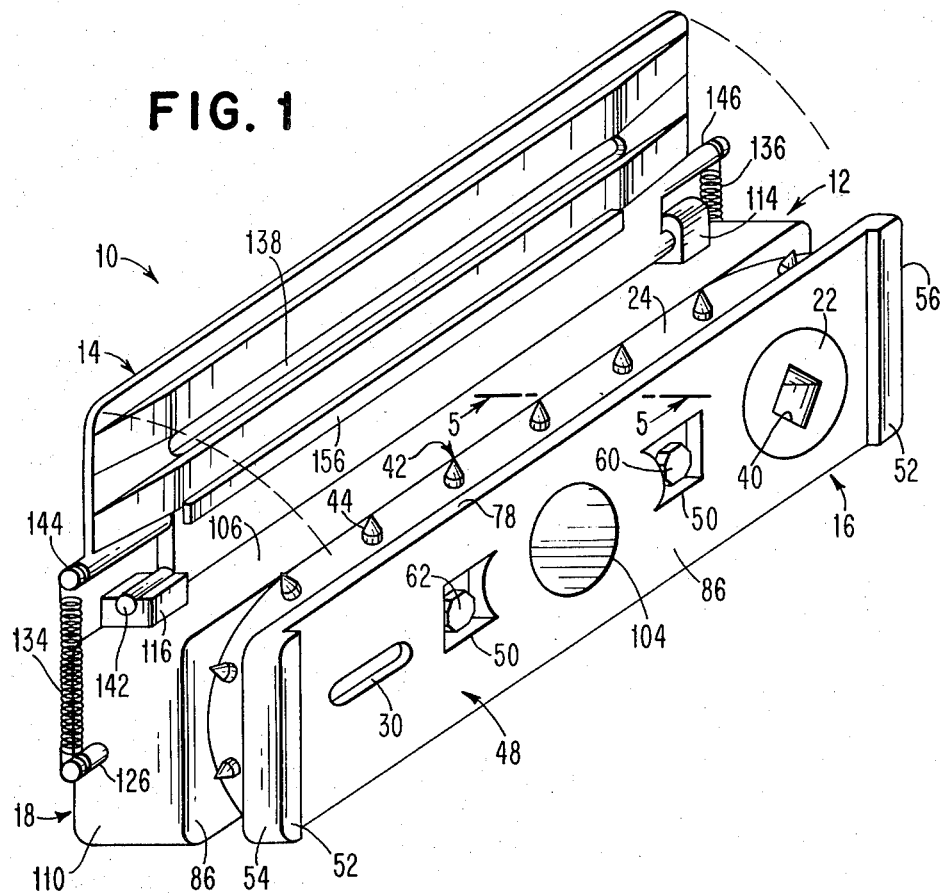
FIG. 1 is an isometric view of the forms feed tractor mechanism.

Referring now to the figures, forms feed tractor mechanism 10 will be described. Tractor 10 consists of two basic portions housing 12 and door 14. Housing 12, in turn, has inner section 16 and outer section 18. Between and contained by inner section 16 and outer section 18 is a spring loaded tension assembly 20, a sprocket 22, and an endless belt 24. Tensioner 20 is shaped similar to the letter D having a flat portion on the top and bottom and a semi-circular portion on one side, and the other side being vertical and having an indentation (not shown) into which spring 26 may be inserted. Tensioner 20 also has a pair of extensions 28, one of which is shown, adapted to fit in hole 30 in inner section 16 and a corresponding hole in outer section 18. As shown, hole 30 may be ovally shaped to provide the proper vertical alignment for tensioner 20. Hole 30 should be slightly longer than extension 28 so that retention 28 can slide horizontally under spring pressure in hole 30, to apply tension to belt 24. Tensioner 20 also includes an indentation 32 forming a channel to support and guide the inside of endless belt 24.

Sprocket 22 is circular shaped and includes a plurality of indentation 34 on the periphery thereof. Sprocket 22 also includes a circular lip 36 on each side thereof adapted to fit in the hole 38 in inner section 16 and outer section 18 to be maintained thereby free to rotate. Sprocket 22 also includes a square hole in its center adapted to receive a corresponding shaped rod which may be driven by a stepping motor, for instance, to cause rotation of sprocket 22.

Endless belt 24 includes a strip of non-stretchable polyimide film, such as Kapton, to which a pin and driving element 42 is affixed. Pin and driving element 42 includes an outward extending pin 44 having a cylindrical shaped bottom portion and conical shaped top portion. On the inside of belt 24, inward extending driving elements 46 are positioned directly opposite to the pins 44. The spacing between the pin and driving elements 42 and the shape of the driving elements 46 is selected to the same as the spacing and shape of the indentations 34 in sprocket 22 so that sprocket 22 when rotated may at the same time rotate belt 24. The shape of the pin 44 on belt 24 is selected so that the diameter of the cylindrical portion of the pin 44 is slightly less than the holes in the record medium being moved and of a spacing equivalent to the distance between the holes in the record medium. As belt 24 is rotated by sprocket 22, the pins 44 are inserted into the holes of the record medium as each pin 44 moves upward over the curved portion of tensioner 20.

Inner section 16 of housing 12 has inside surface 48 having a pair of indentations 50 therein. Also, a pair of lips 52 extend from inner surface 48 at the junction of the front 54 and back 56 of inner section 16. The lips serve to provide a wider surface for receiving the record medium as it enters and leaves the tractor mechanism 10.

Inner section 16 has on its outside surface 88 an extention 58 adapted to have the vertical portion of tensioner 20 applied thereagainst on one end and sprocket 22 applied adjacent thereto on the other end. Extended portion 58 is designed to mate against a similar extension 90 on outer section 18 and to be secured together by bolts 60 and 62 inserted through holes 64 and 66 into a self-threading hole in outer section 18. It should be noted that holes 64 and 66 are within indentation 50 on the inside surface 48 of inner section 16. On the extended portion 58 surrounding each of hole 64 and 66, is circular extended portions 70 and 72 designed to fit into corresponding indentations 72 in outer section 18. Extended portion 58 also includes an indentation 76 adapted to receive the other end of the spring 26 when tensioner 20 is positioned against inner section 16.

The top 78 of extended portion 58 of inner section 16 has a cutaway portion 80 which when secured to outer section 18 forms a channel upon which driving elements 46 rest as belt 24 is rotated. The cutaway portion 80 is in alignment with channel 32 of tensioner 20 when tensioner 20 is positioned against inner section 16.

The top of extended portion 58 is parallel to the top of inner section 16 for the initial approximately three-fourths thereof in the direction of travel of belt 24. However, as the pins 42 on belt 24 approach sprocket 22, they travel over a downward sloping ramp 82 which slopes down at approximately a 2 degree angle. The purpose of ramp 82 is to allow the pins to be essentially vertically removed from the holes in the paper prior to being rotated by sprocket 22. A similar ramp 84 at a 10 degree slope is provided on tensioner 20 to allow the pins to be inserted in a near-vertical fashion into the holes in the paper. The purpose of both ramps 82 and 84 is to prevent pins 44 from damaging the holes in the record medium being moved by tractor 10.

Figure 2:
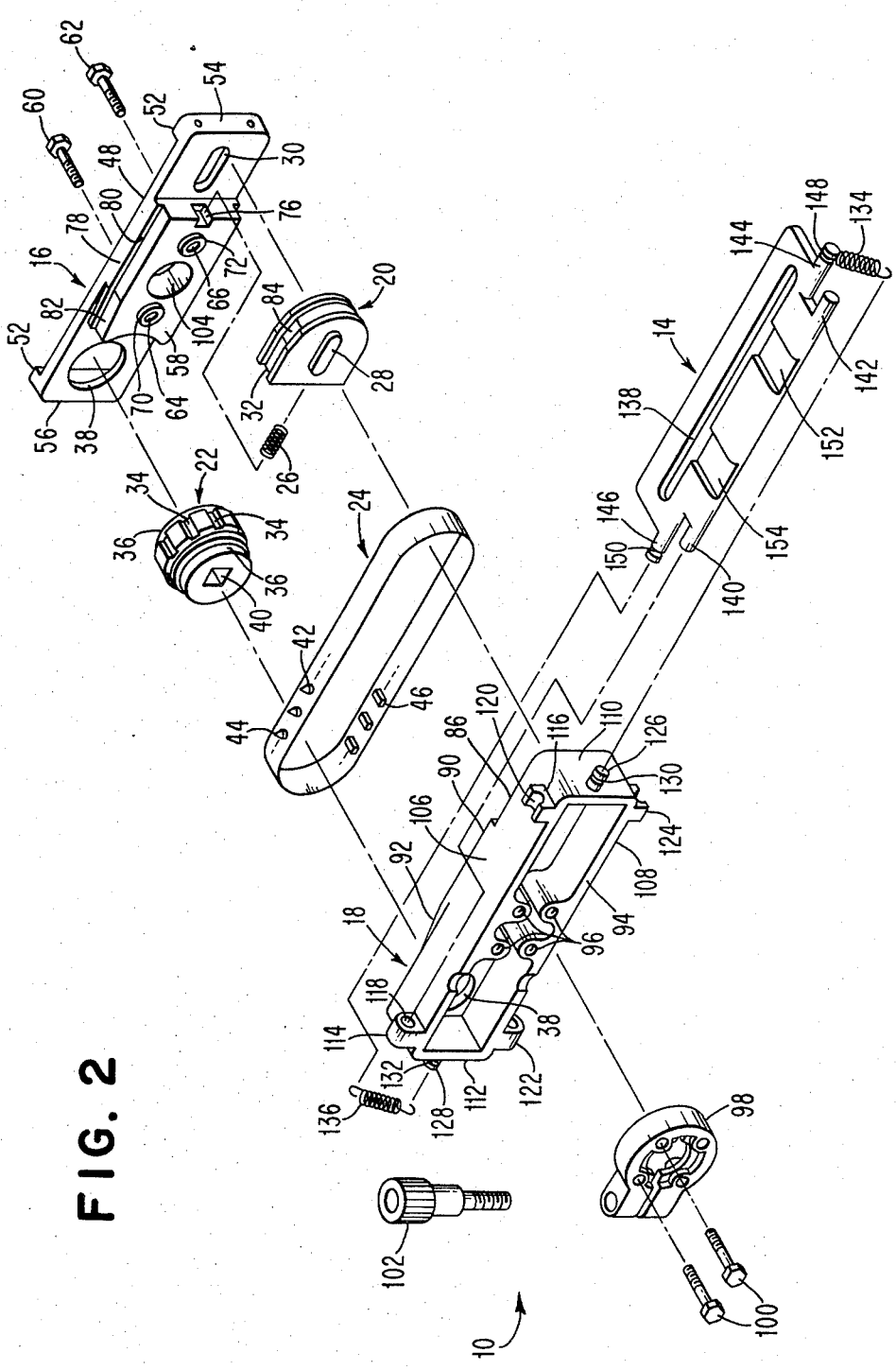
FIG. 2 is an exploded view of the various parts of the forms feed tractor mechanism shown in FIG. 1.

Referring now to outer section 18, the inside surface 86 of outer section 18 is adapted to receive the outside surface 88 of inner section 16. Outer section 18 also has an extended portion 90 which forms the other side of the channel together with cutaway portion 80. Extended portion 90 includes a ramp 92 similar to that of ramp 82. The outside surface 94 of outer section 18 includes four threaded holes 96 for securing clamp 98 to outer section 18 by two bolts 100 applied through corresponding holes in clamp 98. Clamp 98 also includes a knob 102 for securing tractor 10 to a rod (not shown) inserted through the center of clamp 98 and hole 104 in inner section 16. It should be noted that bolts 100 are secured to the top two holes of clamp 98 allowing the bottom portion of clamp 98 to remain free to be drawn towards the top portion by turning knob 102. The provisions of four holes in clamp 98 and four holes 96 in outer section 18 is for the purpose of being able to turn clamp 98 180 degrees so that the parts and assembly of a left hand tractor mechanism 10 shown in FIG. 2 can be used as a right hand tractor mechanism by merely turning clamp 98 180 degrees and inserting door 14 on the other side of section 18.

The top and bottom 108 of outer section 18 are identical as are the front 110 and back 112. Top 106 of outer section 18 includes a permanent door receiver 114 and a snap-in door receiver 16. Permanent door receiver 114 includes a closed hole 118, the bottom of which is positioned a given distance above the top 106 of section 18. Snap-in door receiver 116 is similar to receiver 114 except that the upper portion of the hole has been removed leaving an open hole 120 into which a cylindrical post may be snapped fitted. On the bottom 108 of section 18, receivers 122 and 124 are positioned in exactly the same manner as receivers 114 and 116 and serve the same function for a right handed tractor as receivers 114 and 116 serve for the left handed tractor shown, the difference being into which pair of receivers 114, 116 or 122, 124 that door 14 is inserted. The front 110 and back 112 of section 18 includes posts 126 and 128 extending from the vertical center of front 110 and back 112 and in alignment with receivers 114 and 116. Each of posts 126 and 128 have an indentation 130, 132 therein near the outer edge to which one end of respective springs 134 and 136 are attached.

Referring now to door 14, it is generally of the same size as the top of sections 16 and 18 when secured together to form a housing of tractor 10. Door 14 includes a slot 138 from the top to the bottom thereof which when door 14 is positioned into receivers 114 and 116 is in alignment with pins 42.

Door 14 also includes a pair of posts 140 and 142. Post 140 is adapted to be inserted into hole 118 in receiver 114 and post 142 is adapted to being thereafter snap-fitted into receiver 116. Connected in such a manner, door 14 is free to rotate about the axis through hole 118 and partial hole 120. Door 14 also has a second pair of posts 144 and 146 similar to posts 126 and 128 on section 18.

Posts 144 and 146 also include indentations 148 and 150 to which the other end of springs 134 and 136 are attached when door 14 is inserted in receivers 114 and 116. Door 14 also includes slots 152 and 154 positioned so that when door 14 is rotated into the open position, clamp knob 102 will rest against the bottom of slot 154 in the left hand tractor version shown or against the bottom of slot 152 in the alternate right hand tractor version when door 14 is inserted into receivers 122 and 124 and clamp 98 is rotated 180 degrees from that shown. With slots 152 and 154 present, door 14 when rotated into the open position will have rotated slightly past the vertical so that springs 134 and 136 will maintain door 14 firmly against knob 102, thereby maintaining door 14 open.

Figure 5:
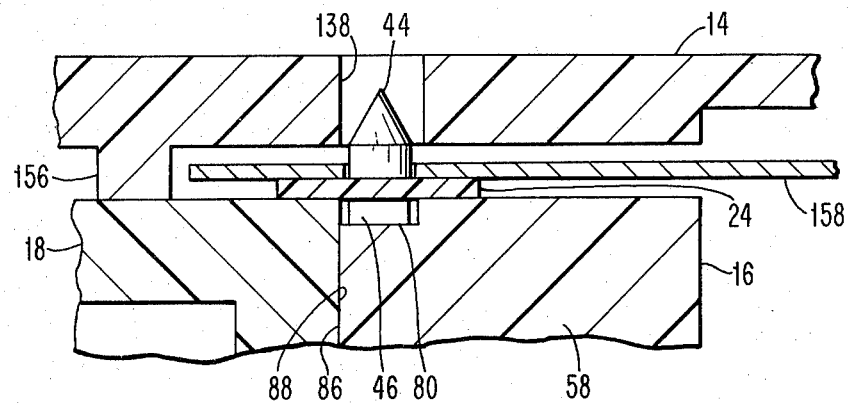
FIG. 5 is a view taken across lines 5—5 of the FIG. 1 with the door in the closed position, and the record medium inserted.
Figure 3:
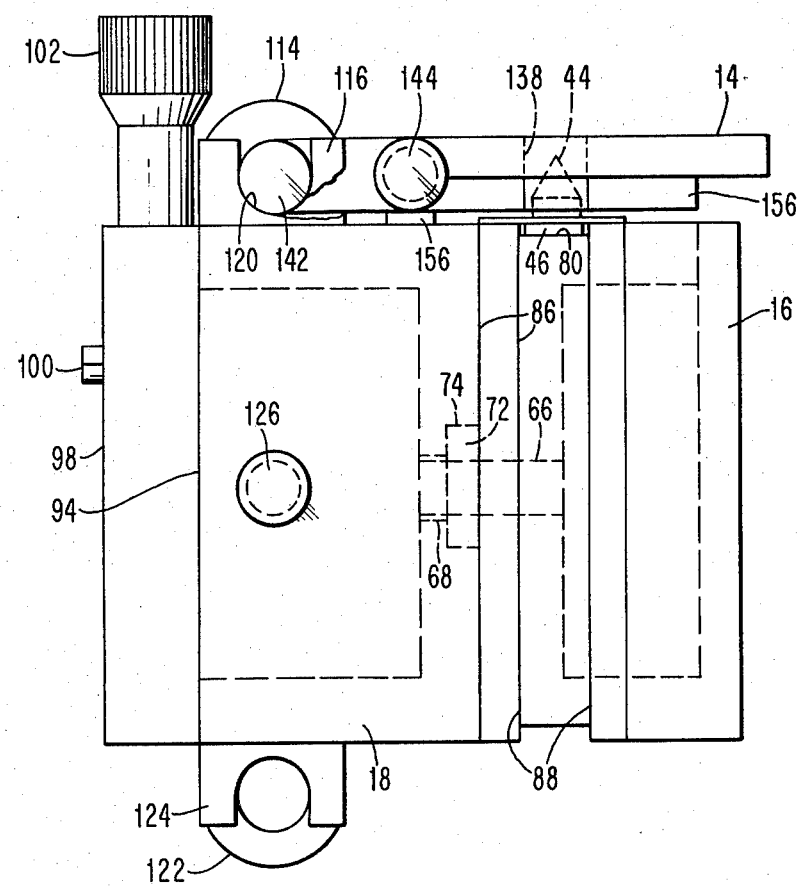
FIG. 3 is an end view of the tractor mechanism shown in FIG. 1.
Figure 4:
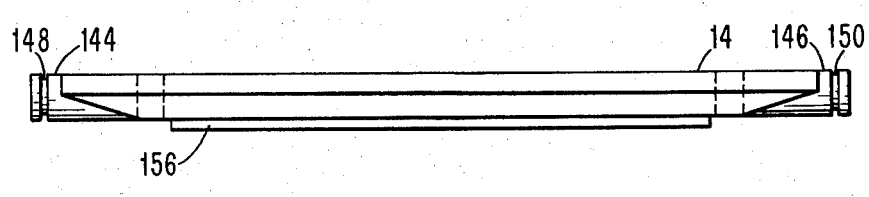
FIG. 4 is a side view of the door shown in FIG. 1.

When door 14 is in a closed position, it is necessary that spring 134 and 136 not cause the bottom of door 14 to contact the top surface of inner section 16 or outer section 18 over which the record medium passes. On the bottom side of door 14, extension 156 is provided and extends from the bottom surface of the door 14 a distance approximately equal to the distance the bottom of holes 118 and 120 are above the top surface of section 18. Thus, when door 14 is rotated into the down position, as shown in FIGS. 3 and 5, the entire bottom surface thereof is maintained parallel to the top 78 a distance equivalent to the extension 156 distance. Extension 156 must be positioned away from the area in which the record medium is positioned on the one hand, and on the other hand, as far away from posts 140 and 142 as possible to lessen the shear forces on posts 140 and 142. FIGS. 3 and 5 best show the manner in which extension 156 and pins 140 and 142 maintain door 14 above the upper surfaces of sections 16 and 18. FIG. 5, in particular, shows in cut-away views the manner in which the record medium 158 travels over top 78 with respect to the positioning of extension 156.

Each of the parts described herein with the exception of belt 24, spring 26, and bolts 60, 62 and 100 may be constructed of molded glass filled polycarbonate in a known manner. Belt 24 may be a Kapton belt having holes therethrough and pins and driving element 42 may be a molded glass filled nylon material which may be inserted through the holes in belt 24 or may be molded to belt 24 or heat or ultrasonically staked together through the holes in belt 24.

What is claimed is:

1. A forms feed tractor mechanism for moving an inserted planer record medium in a given direction, said record medium having a record side and a back side opposite to said record side, said record medium further having perforations along the edge thereof, said forms feed tractor mechanism comprising:

a plurality of pins arranged in an endless belt and adapted to engage said perforations;

means adapted to be rotated for moving said endless belt;

housing means for containing said endless belt and moving means, said housing means having a top generally coplanar with the back side of said record medium, when inserted, a bottom generally parallel to said top, an inner side and an outer side connecting said top bottom and positioned such that said inner side is beneath said record medium, when inserted, and said outer side is beyond the edge of said record medium, when inserted, a front positioned upstream from said given direction and a back positioned downstream from said given direction, said housing means including door receiving means positioned between the edge of said record medium, when inserted, and said outer side, and spring attachment means positioned on at least one of said front or back in vertical alignment with said door receiving means;

door means including means for pivotably engaging said door receiving means to allow said door to rotate between open and closed positions, spring attachment means positioned between said engaging means and a position on said door, when closed, above the edge of said record medium, when inserted, and means extending from the bottom of said door means at a position to engage the top of said housing means when said door means is closed at a position between said outer side and the edge of said record medium, when inserted, said extending means maintaining a gap of a desired distance between that portion of the bottom of said door means above said record medium and said record medium when said door means is closed; and spring means connected between said spring attachment means of said housing means and said door means.

2. The invention according to claim 1 wherein said door receiving means maintains said door means approximately said given distance above said housing means top.

3. The invention according to claim 2 wherein said door means engaging means comprise a pair of cylindrical shape posts extending from opposite ends of said door means; and wherein said door receiving means include hollow cylinder means positioned above the top of said housing means for receiving one of said cylindrical posts and snap in means positioned above the top of said housing means and into which the other cylindrical post is snapped, said snap in means including a partial cylindrical portion to allow rotation of said door means.

4. The invention according to claim 3 wherein said means extending from said door is aligned with said door means spring attachment means.

5. The invention according to claim 4 wherein said door means includes slot means to allow said endless belt pins to be moved while said door means is rotated in a closed position.

6. The invention according to claim 1 wherein said housing means includes door receiving means on the top and bottom of said housing.

* * * * *